(12) United States Patent
Kasazumi et al.

(10) Patent No.: US 10,663,722 B2
(45) Date of Patent: May 26, 2020

(54) DISPLAY DEVICE

(71) Applicant: Panasonic Intellectual Property Management Co., Ltd., Osaka (JP)

(72) Inventors: Ken'ichi Kasazumi, Osaka (JP); Toshiya Mori, Osaka (JP); Kosuke Kubota, Osaka (JP); Masahito Ogata, Osaka (JP)

(73) Assignee: PANASONIC INTELLECTUAL PROPERTY MANAGEMNET CO., LTD., Osaka (JP)

( * ) Notice: Subject to any disclaimer, the term of this patent is extended or adjusted under 35 U.S.C. 154(b) by 37 days.

(21) Appl. No.: 16/066,356

(22) PCT Filed: Nov. 21, 2016

(86) PCT No.: PCT/JP2016/004935
§ 371 (c)(1),
(2) Date: Jun. 27, 2018

(87) PCT Pub. No.: WO2017/125974
PCT Pub. Date: Jul. 27, 2017

(65) Prior Publication Data
US 2019/0018240 A1    Jan. 17, 2019

(30) Foreign Application Priority Data
Jan. 20, 2016    (JP) .................... 2016-009303

(51) Int. Cl.
*G02B 27/01*    (2006.01)
*G09G 3/00*    (2006.01)
(Continued)

(52) U.S. Cl.
CPC .......... *G02B 27/0101* (2013.01); *B60K 35/00* (2013.01); *G02B 27/01* (2013.01);
(Continued)

(58) Field of Classification Search
CPC ........ G02B 27/0172; G02B 2027/0178; G02B 27/0176; G02B 27/0101;
(Continued)

(56) References Cited

U.S. PATENT DOCUMENTS

2005/0200962 A1* 9/2005 Voloschenko ....... G02B 5/0278
                                                        359/630
2009/0141363 A1*  6/2009 Shin ................... G02B 27/0101
                                                        359/630
(Continued)

FOREIGN PATENT DOCUMENTS

| JP | 2009-150947 | 7/2009 |
| WO | 2011/132406 | 10/2011 |
| WO | 2015/190157 | 12/2015 |

OTHER PUBLICATIONS

International Search Report of PCT application No. PCT/JP2016/004935 dated Jan. 31, 2017.

*Primary Examiner* — Thomas K Pham
*Assistant Examiner* — Sharrief I Broome
(74) *Attorney, Agent, or Firm* — Greenblum & Bernstein, P.L.C.

(57) ABSTRACT

The display device includes: a display unit that projects a light beam onto a windshield so that the light beam is reflected from the windshield such that one or more virtual images are displayed in a space further than the windshield in a depth direction through the windshield; and a controller that controls the display unit so that a first vertical image and a second vertical image included in the one or more virtual images and have different distances from the windshield in the depth direction, are displayed in a time-division manner.

8 Claims, 13 Drawing Sheets

(51) Int. Cl.
*B60K 35/00* (2006.01)
*G02B 27/09* (2006.01)
*G03B 21/28* (2006.01)

(52) U.S. Cl.
CPC ......... *G02B 27/0977* (2013.01); *G03B 21/28* (2013.01); *G09G 3/003* (2013.01); *B60K 2370/334* (2019.05); *G02B 2027/0127* (2013.01); *G02B 2027/0185* (2013.01); *G09G 2354/00* (2013.01)

(58) Field of Classification Search
CPC .... G02B 2027/0118; G02B 2027/0138; G02B 27/017; G02B 2027/014; G02B 27/0093; G02B 5/30; G02B 2027/015; G02B 2027/0123; G02B 27/01; G02B 27/0149; G02B 2027/0154; G02B 2027/0127; G02B 2027/013; G02B 2027/0159; G02B 2027/011; G02B 2027/0161; B60K 35/00; B60K 2370/1529; B60K 2370/66; B60K 2370/67; B60K 37/02; B60K 2370/151; B60K 2370/1531; B60K 2370/154; B60K 2370/155; B60K 2370/174; B60K 2370/177; B60K 2370/178; B60K 2370/186; B60K 2370/1868; B60K 2370/191; B60K 2370/194; B60K 2370/20; B60K 2370/334; B60K 2370/52; B60K 2370/73

See application file for complete search history.

(56) References Cited

U.S. PATENT DOCUMENTS

| | | | |
|---|---|---|---|
| 2009/0160736 A1* | 6/2009 | Shikita | G02B 27/0101 345/7 |
| 2012/0099170 A1 | 4/2012 | Shikii et al. | |
| 2014/0362448 A1* | 12/2014 | Yamada | G02B 27/0101 359/631 |
| 2015/0116837 A1* | 4/2015 | Yamada | B60K 35/00 359/632 |
| 2017/0146803 A1* | 5/2017 | Kishigami | G02B 5/30 |

* cited by examiner

DISPLAY DEVICE

This application is a U.S. national stage application of the PCT International Application No. PCT/JP2016/004935 filed on Nov. 21, 2016, which claims the benefit of foreign priority of Japanese patent application No. 2016-009303 filed on Jan. 20, 2016, the contents all of which are incorporated herein by reference.

TECHNICAL FIELD

The present disclosure relates to a display device for displaying an image.

BACKGROUND ART

As a display device for displaying an image, a vehicular head-up display (HUD) has been known, for example (refer to PTL 1, for example). The head-up display employs so-called augmented reality (AR), and displays a virtual image of an image formed on a screen, in a space in front of a windshield of a vehicle in a two-dimensional (2D) manner. With this configuration, a driver can view information about driving (for example, car navigation information) overlapped on a scene in front of the windshield.

CITATION LIST

Patent Literature

PTL 1: Unexamined Japanese Patent Publication No. 2009-150947

SUMMARY OF THE INVENTION

A display device according to one aspect of the present disclosure includes: a display unit that projects a light beam onto a display medium based on image data so that the light beam reflected from the display medium to display one or more virtual images in a space further than the display medium in a depth direction through the display medium; and a controller that controls the display unit so that a plurality of images which is included in the one or more virtual images is displayed in a time-division manner, the plurality of images having different distances from the display medium in the depth direction.

Noted that those comprehensive, specific aspects may be implemented by a system, a method, an integrated circuit, a computer program, or a computer-readable recording medium such as a CD-ROM, or may be implemented by any combination of the system, the method, the integrated circuit, the computer program, and the recording medium.

The display device according to the present disclosure can enhance visibility of a plurality of images overlapping one another in the depth direction.

DESCRIPTION OF EMBODIMENT

Figure 1:
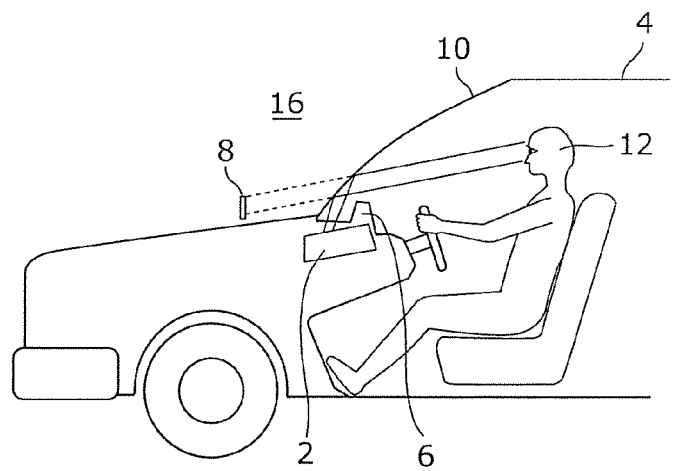
FIG. 1 is a view illustrating a usage example of a display device according to an exemplary embodiment.

Prior to describing an exemplary embodiment of the present disclosure, problems found in a conventional technique will be briefly discussed. In the conventional display device described above, an image (marker) indicating the presence of a pedestrian in front of the vehicle is displayed overlapped on the pedestrian. If two or more pedestrians are in line in the depth direction (that is, in the travel direction of the vehicle as viewed from a driver), a plurality of images overlaps one another in the same plane, entailing a problem of reduction in visibility of the plurality of images.

In view of this, the present disclosure provides a display device that can enhance visibility of a plurality of images overlapping one another in the depth direction through the display medium.

To address the foregoing problem, a display device according to one aspect of the present disclosure includes: a display unit that projects a light beam onto a display medium based on image data so that the light beam is reflected from the display medium such that one or more virtual images are displayed in a space further than the display medium in a depth direction through the display medium; and a controller that controls the display unit so that a plurality of images which is included in the one or more virtual images is displayed in a time-division manner, the plurality of images having different distances from the display medium in the depth direction.

According to this aspect, the plurality of images having different distances from the display medium in the depth direction is displayed in a time-division manner, whereby visibility of the plurality of images can be enhanced, even when the plurality of images overlaps one another in the depth direction.

For example, the plurality of images may include a first image and a second image, and the controller may control the display unit so that the first image is displayed in an odd-numbered frame of the image data and the second image is displayed in an even-numbered frame of the image data to display the first image and the second image in a time-division manner.

According to this aspect, the first image and the second image can be displayed in a time-division manner with a relatively simple configuration.

For example, the plurality of images may include a first image and a second image, and the controller may control the display unit so that the first image and the second image are displayed alternately every two or more frames of the image data to display the first image and the second image in a time-division manner.

According to this aspect, the first image and the second image can be displayed in a time-division manner with a relatively simple configuration.

For example, the display unit may include: a light source configured to emit a light beam; a scanner configured to cause the light beam from the light source to scan; a movable screen in which the images are formed by transmitting the light beam from the scanner; a drive unit configured to cause the movable screen to reciprocate in a direction away from the scanner and in a direction approaching the scanner; and an optical system configured to display the images formed in the movable screen in the space.

According to this aspect, the movable screen reciprocates in the direction away from the scanner and in the direction approaching the scanner, whereby the plurality of images having different distances from the display medium in the depth direction can be displayed in a time-division manner.

For example, the display medium may be a vehicular windshield, and the space may be a space in front of the vehicular windshield as viewed from a driver.

According to this aspect, the display device can be used as a vehicular head-up display.

Noted that those comprehensive, specific aspects may be implemented by a system, a method, an integrated circuit, a computer program, or a computer-readable recording medium such as a CD-ROM, or may be implemented by any combination of the system, the method, the integrated circuit, the computer program, and the recording medium.

Hereinafter, an exemplary embodiment will specifically be described with reference to the drawings.

Note that the following exemplary embodiment provides comprehensive, specific examples of the present disclosure. Numerical values, shapes, materials, constituent elements, arrangement positions and connection modes of the constituent elements, steps, and order of the steps, for example, illustrated in the following exemplary embodiment are merely examples, and therefore are not intended to limit the present disclosure. Furthermore, among constituent elements in the following exemplary embodiment, constituent elements not recited in the independent claim indicating the broadest concept are described as optional constituent elements.

Exemplary Embodiment

[1. Schematic Configuration of Display Device]

Figure 2:
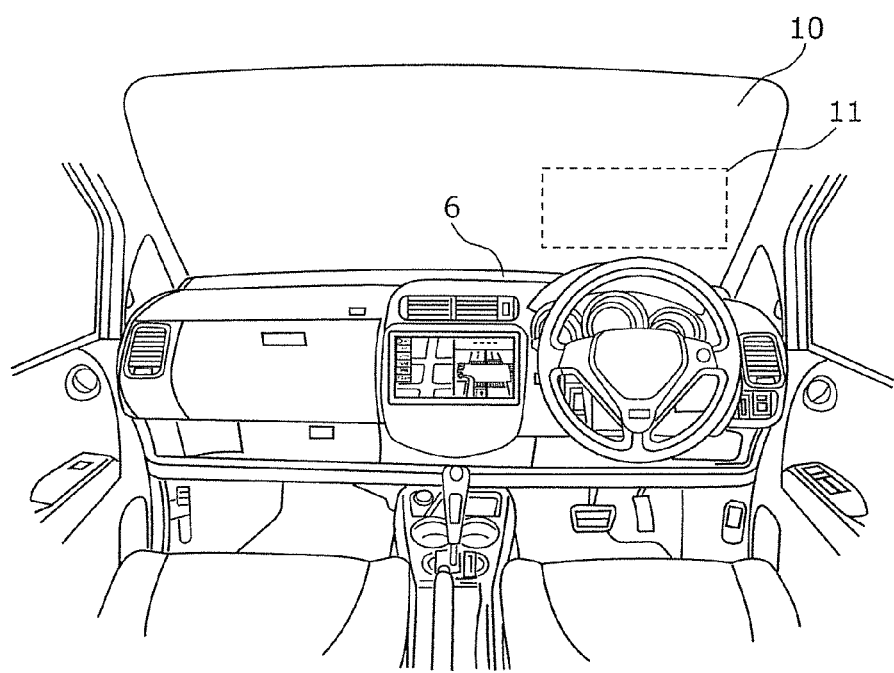
FIG. 2 is a view illustrating an area of an image displayed by the display device according to the exemplary embodiment.
Figure 3:
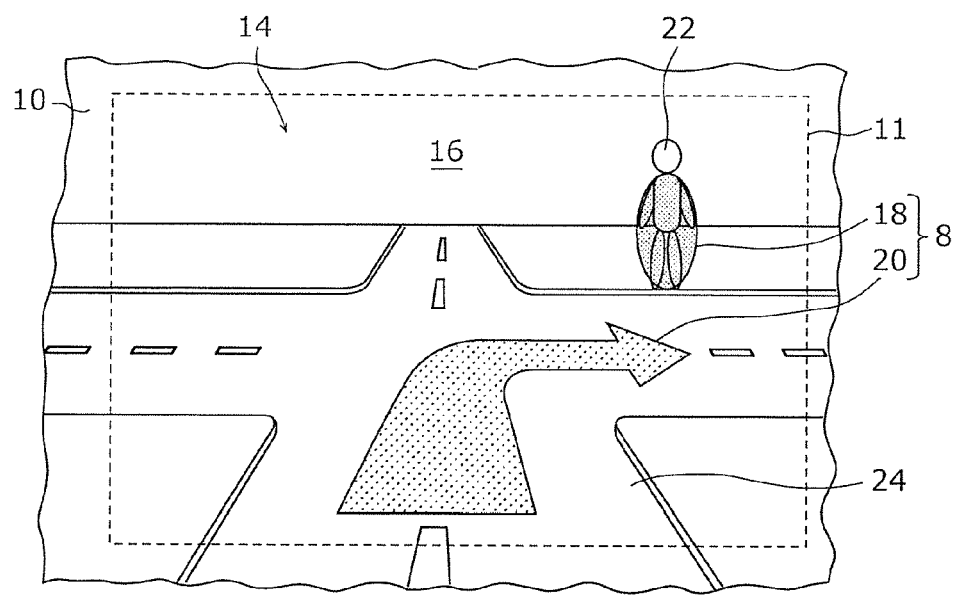
FIG. 3 is a view illustrating an example of the image displayed by the display device according to the exemplary embodiment.

First, a schematic configuration of display device 2 according to an exemplary embodiment will now be described herein with reference to FIGS. 1 to 3. FIG. 1 is a view illustrating a usage example of display device 2 according to the exemplary embodiment. FIG. 2 is a view illustrating area 11 of image 8 displayed by display device 2 according to the exemplary embodiment. FIG. 3 is a view illustrating an example of image 8 displayed by display device 2 according to the exemplary embodiment.

As illustrated in FIG. 1, display device 2 according to the exemplary embodiment is, for example, a vehicular head-up display, and is disposed in dashboard 6 of automobile 4 (an example of a vehicle).

As illustrated in FIGS. 1 and 2, display device 2 projects a laser light beam (an example of a light beam) for displaying image 8 that is a virtual image toward, for example, area 11 that locates at a lower part in windshield 10 (an example of a display medium) and is close to a driver seat in automobile 4. With this, the laser light beam is reflected by windshield 10 toward driver 12. Therefore, as illustrated in FIG. 3, driver 12 can view image 8 that is the virtual image overlapped on scene 14 in front of windshield 10. In other words, display device 2 displays (projects) image 8 that is the virtual image in space 16 in front of windshield 10 in a three-dimensional (3D) manner.

In the example illustrated in FIG. 3, image 8 displayed by display device 2 includes vertical image 18 and depth image 20. Vertical image 18 is a virtual image displayed in a vertical direction (up-and-down direction in FIG. 1) in space 16 in front of windshield 10. Vertical image 18 is, for example, a marker having a substantially elliptical shape that is vertically long, and is displayed superimposed on pedestrian 22 present in front of automobile 4. This configuration allows driver 12 to easily notice the presence of pedestrian 22.

Meanwhile, depth image 20 is a virtual image displayed in a depth direction (right-and-left direction in FIG. 1 and the direction perpendicular to the sheet surface of FIG. 3) that is a direction intersecting the vertical direction in space 16 in front of windshield 10. Depth image 20 is, for example, an arrow for guiding a traveling route to a destination (an arrow for instructing to turn right at an intersection, in an example in FIG. 3), and is displayed superimposed on road 24 present in front of automobile 4. This configuration allows driver 12 to easily find the traveling route to the destination.

[2. Specific Configuration of Display Device]

Figure 4:
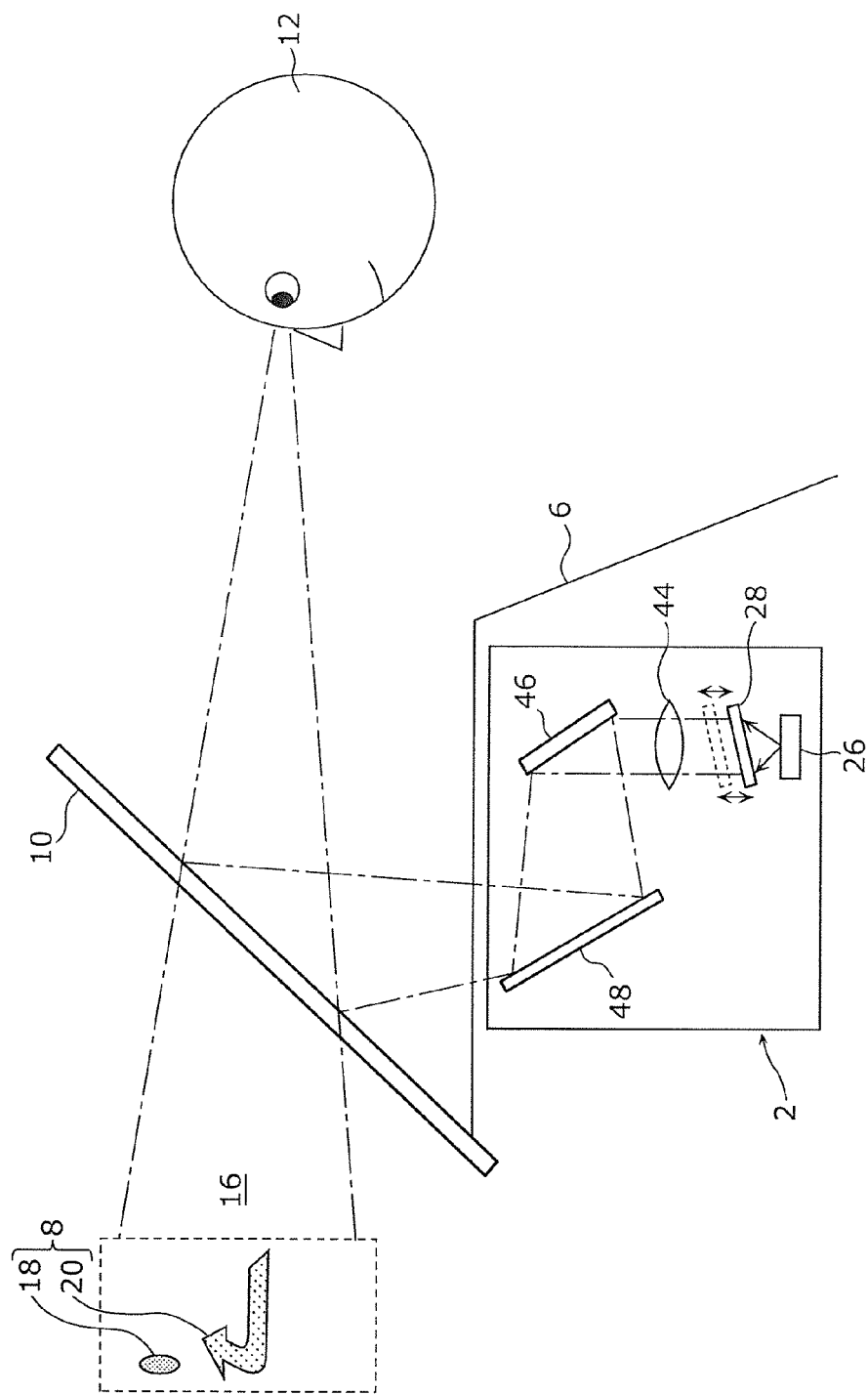
FIG. 4 is a view illustrating a configuration of the display device according to the exemplary embodiment.
Figure 5:
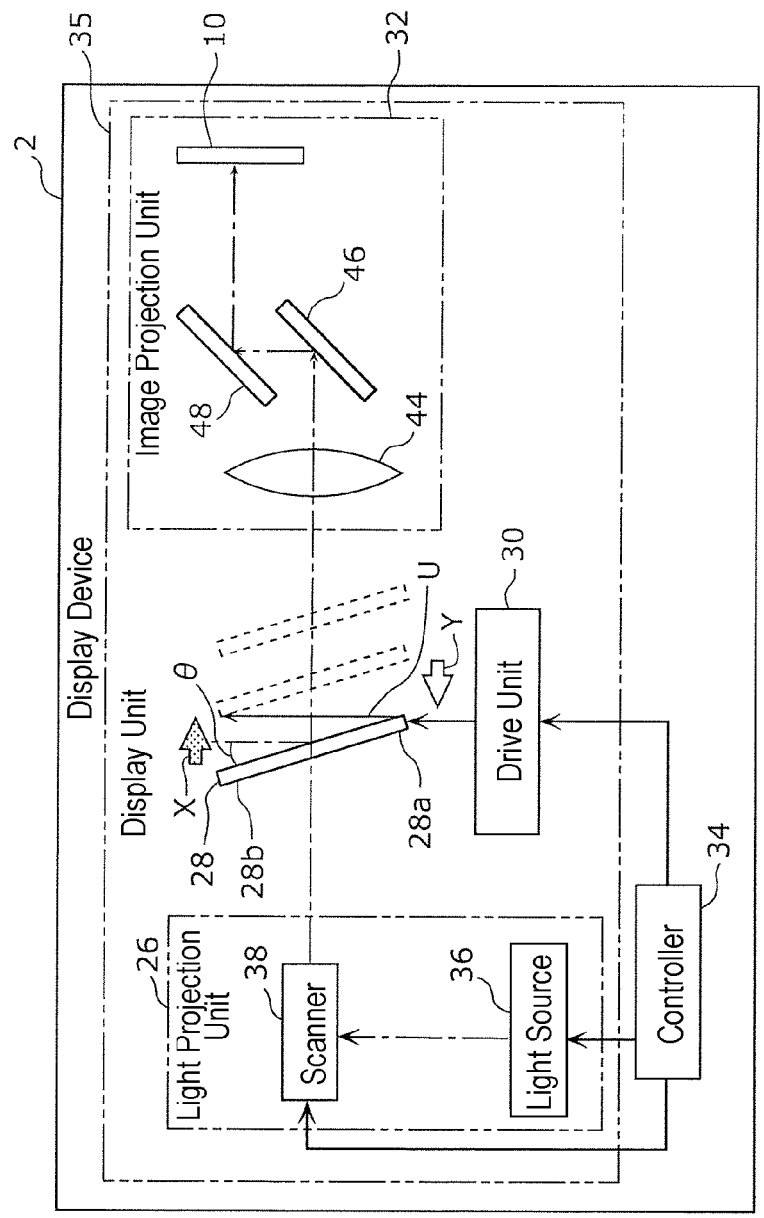
FIG. 5 is a block diagram illustrating a functional configuration of the display device according to the exemplary embodiment.

Next, specific configurations of display device 2 according to the exemplary embodiment will be described with reference to FIGS. 4 and 5. FIG. 4 is a view illustrating the configuration of display device 2 according to the exemplary embodiment. FIG. 5 is a block diagram illustrating a functional configuration of display device 2 according to the exemplary embodiment.

As illustrated in FIGS. 4 and 5, display device 2 includes light projection unit 26, movable screen 28, drive unit 30, image projection unit 32 (an example of an optical system), and controller 34. Light projection unit 26, movable screen 28, drive unit 30, and image projection unit 32 constitute display unit 35.

Light projection unit 26 includes light source 36 and scanner 38. Light source 36 includes a red laser diode that emits a laser light beam having a red component (R), a green laser diode that emits a laser light beam having a green component (G), and a blue laser diode that emits a laser light beam having a blue component (B). The laser light beam having the red component, the laser light beam having the green component, and the laser light beam having the blue component that are emitted from light source 36 are synthesized by, for example, a dichroic mirror (not illustrated) and the synthesized laser light beam enters scanner 38.

Scanner 38 is configured with a micro electro mechanical systems (MEMS) mirror, for example. Scanner 38 reflects the entering laser light beam toward a direction according to a deflection angle thereof, and therefore causes the laser light beam from light source 36 to raster-scan movable screen 28 in a two-dimensional manner. Scanner 38 causes the laser light beam to raster-scan from first end 28a (a lower end in FIG. 5) toward second end 28b (an upper end in FIG. 5) of movable screen 28, for example. Note that first end 28a is an end farther from scanner 38, and second end 28b is an end closer to scanner 38.

Movable screen 28 is a rectangular screen having translucency (for example, semitransparency). As illustrated in FIG. 5, movable screen 28 is disposed so as to reciprocate in a first direction and in a second direction on an optical path of the laser light beam from scanner 38. The first direction is a direction away from scanner 38 (a direction indicated by arrow X in FIG. 5), and the second direction is a direction approaching scanner 38 (a direction indicated by arrow Y in FIG. 5). Further, movable screen 28 reciprocates in a posture inclined to moving directions (first and second directions) of movable screen 28.

When movable screen 28 is moving in the first direction, the laser light beam from scanner 38 raster-scans movable screen 28, whereby first screen image 40 (refer to FIG. 7 described later) is formed in movable screen 28. Meanwhile, when movable screen 28 is moving in the second direction, the laser light beam from scanner 38 raster-scans movable screen 28, whereby second screen image 42 (refer to FIG. 7 described later) is formed in movable screen 28. Note that methods for forming first screen image 40 and second screen image 42 will be described in detail later.

Drive unit 30 is configured with an actuator, for example. Drive unit 30 causes movable screen 28 to reciprocate (vibrate) in the first and second directions at a constant frequency (for example, 60 Hz) and with constant amplitude (for example, 1 mm), based on a drive signal from controller 34. Note that drive unit 30 causes movable screen 28 to reciprocate such that a period of time during which movable screen 28 moves in the first direction (or the second direction) is, for example, 25 msec or less, based on the drive signal from controller 34.

Image projection unit 32 includes magnifying lens 44, first reflecting plate 46, second reflecting plate 48, and windshield 10.

Magnifying lens 44 is disposed on the optical path of the laser light beam transmitting through movable screen 28. Magnifying lens 44 magnifies first screen image 40 or second screen image 42 formed in movable screen 28.

First reflecting plate 46 and second reflecting plate 48 are disposed on the optical path of the laser light beam from magnifying lens 44, and reflect the laser light beam from magnifying lens 44 toward windshield 10. With this configuration, first reflecting plate 46 and second reflecting plate 48 project first screen image 40 or second screen image 42 magnified by magnifying lens 44 toward windshield 10.

Windshield 10 is disposed on the optical path of the laser light beam from second reflecting plate 48, and reflects the laser light beam from second reflecting plate 48 toward driver 12. With this configuration, when first screen image 40 is formed in movable screen 28, vertical image 18 that is the virtual image of first screen image 40 is displayed in space 16 in front of windshield 10. Meanwhile, when second screen image 42 is formed in movable screen 28, depth image 20 that is the virtual image of second screen image 42 is displayed in space 16 in front of windshield 10. Noted that movable screen 28 reciprocates at a relatively high speed, and therefore driver 12 views first screen image 40 and second screen image 42 as if the two images are displayed simultaneously.

Controller 34 has a function for outputting the drive signal to drive unit 30, a function for controlling a drive current supplied to light source 36, and a function for controlling a deflection angle of scanner 38. Controller 34 is configured with, for example, a central processing unit (CPU) or a processor, and reads and executes a computer program stored in a memory (not illustrated) to perform the above-described functions.

[3. Operation of Display Device]

Figure 6:
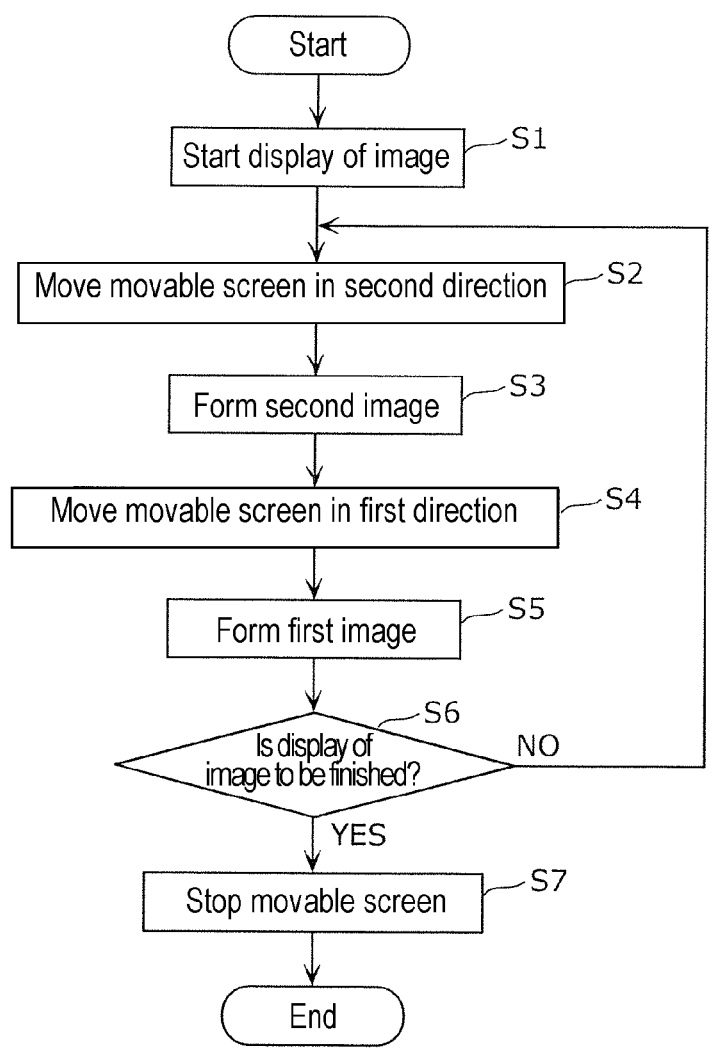
FIG. 6 is a flowchart illustrating a flow of operation of the display device according to the exemplary embodiment.
Figure 7:
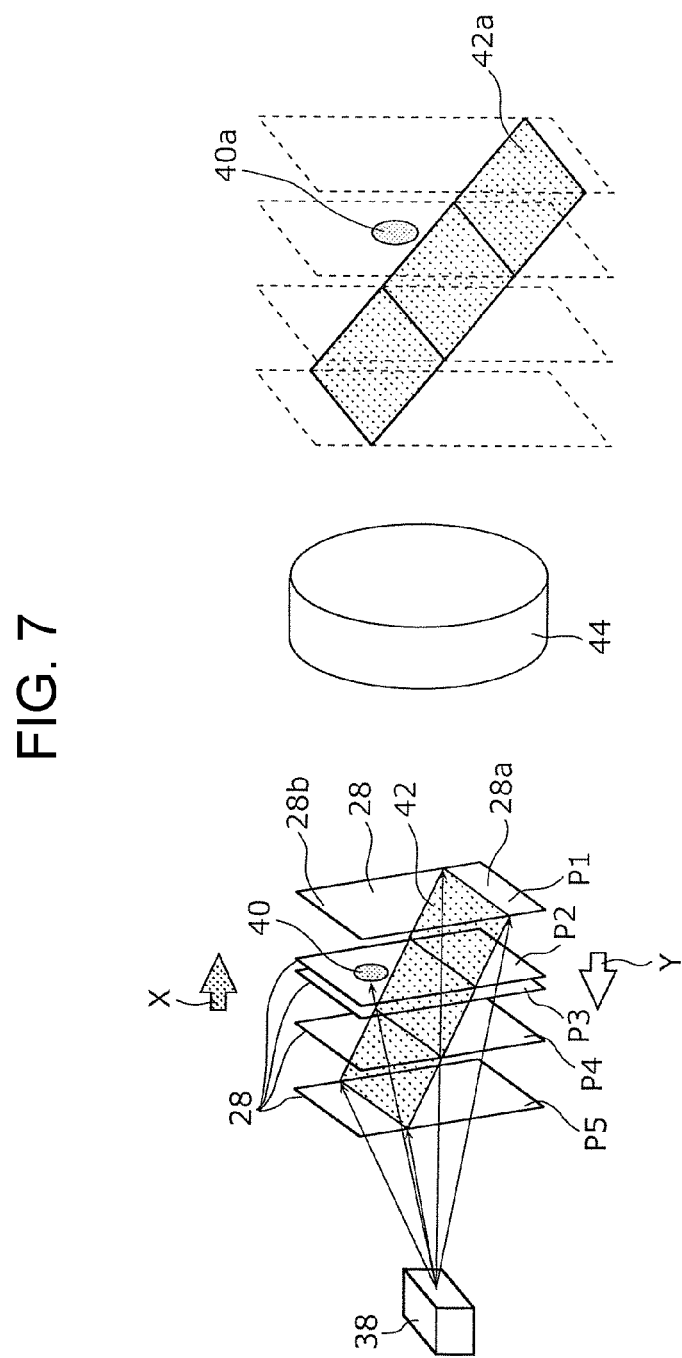
FIG. 7 is a view for describing a method for forming a first screen image and a second screen image performed by the display device according to the exemplary embodiment.
Figure 8:
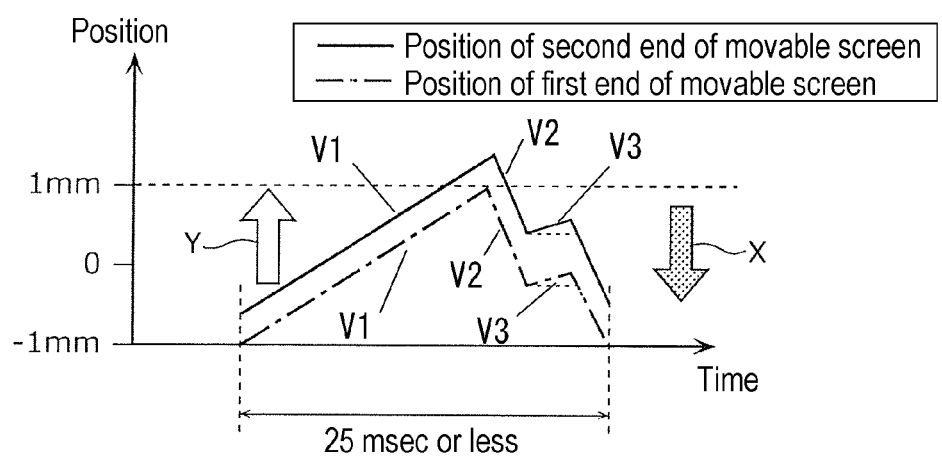
FIG. 8 is a graph illustrating a temporal change of positions of a first end and a second end of a movable screen in the display device according to the exemplary embodiment.

Subsequently, operation of display device 2 according to the exemplary embodiment will now be described with reference to FIGS. 4 to 8. FIG. 6 is a flowchart illustrating a flow of operation of display device 2 according to the exemplary embodiment. FIG. 7 is a view for describing a method for forming first screen image 40 and second screen image 42 performed by display device 2 according to the exemplary embodiment. FIG. 8 is a graph illustrating a temporal change of positions of first end 28a and second end 28b of movable screen 28 in display device 2 according to the exemplary embodiment.

As illustrated in FIG. 6, display of image 8 is started (S1), and then movable screen 28 starts reciprocating in the first direction and the second direction. As illustrated in FIG. 7, when movable screen 28 moves from position P1 to position P5 in the second direction (a direction indicated by arrow Y in FIG. 7) (S2), the laser light beam from scanner 38 raster-scans movable screen 28 and transmits through movable screen 28, whereby second screen image 42 is formed in movable screen 28 (S3). Specifically, as illustrated in FIG. 7, while movable screen 28 moves from position P1 to position P5 through position P2, position P3, and position P4, a position of the laser light beam transmitting through movable screen 28 moves from first end 28a toward second end 28b of movable screen 28. This causes a forming direction of second screen image 42 to be a direction inclined to the moving directions of movable screen 28. As illustrated in FIG. 8, while movable screen 28 moves in the second direction, a moving speed of movable screen 28 is constant at first speed V1.

As illustrated in FIG. 7, second screen image 42 formed in movable screen 28 is magnified by magnifying lens 44, and therefore, second intermediate image 42a that is the virtual image of second screen image 42 is formed on the light-emitting side of magnifying lens 44. Second intermediate image 42a described above is reflected by first reflecting plate 46 and second reflecting plate 48 to be projected towards windshield 10. Therefore, depth image 20 that is the virtual image of second screen image 42 is displayed in space 16 in front of windshield 10. At this time, a display direction of depth image 20 is a direction corresponding to the forming direction of second screen image 42, that is, the above-described depth direction.

Meanwhile, as illustrated in FIG. 7, when movable screen 28 moves from position P5 to position P1 in the first direction (a direction indicated by arrow X in FIG. 7) (S4), the laser light beam from scanner 38 raster-scans movable screen 28 and transmits through movable screen 28, whereby first screen image 40 is formed in movable screen 28 (S5). Specifically, as illustrated in FIG. 7, while movable screen 28 moves from position P3 to position P2, the position of the laser light beam transmitting through movable screen 28 moves in a direction from first end 28*a* toward second end 28*b* of movable screen 28. With this configuration, a forming direction of first screen image 40 is made perpendicular to the moving directions of movable screen 28, as indicated by arrow U in FIG. 5.

As illustrated in FIG. 8, at timing when the moving speed of movable screen 28 shifts from second speed V2 to third speed V3, first screen image 40 is formed in movable screen 28.

As illustrated in FIG. 7, first screen image 40 formed in movable screen 28 is magnified by magnifying lens 44, and therefore, first intermediate image 40*a* that is the virtual image of first screen image 40 is formed on the light-emitting side of magnifying lens 44. First intermediate image 40*a* described above is reflected by first reflecting plate 46 and second reflecting plate 48 to be projected on windshield 10. Therefore, vertical image 18 that is the virtual image of first screen image 40 is displayed in space 16 in front of windshield 10. At this time, a display direction of vertical image 18 is a direction corresponding to the forming direction of first screen image 40, that is, the above-described vertical direction.

When the display of image 8 is performed continuously (NO in S6), steps S2 to S5 described above are executed again. When the display of image 8 is to be finished (YES in S6), movable screen 28 stops reciprocating (S7).

[4. First Display Example]

Figure 9A:
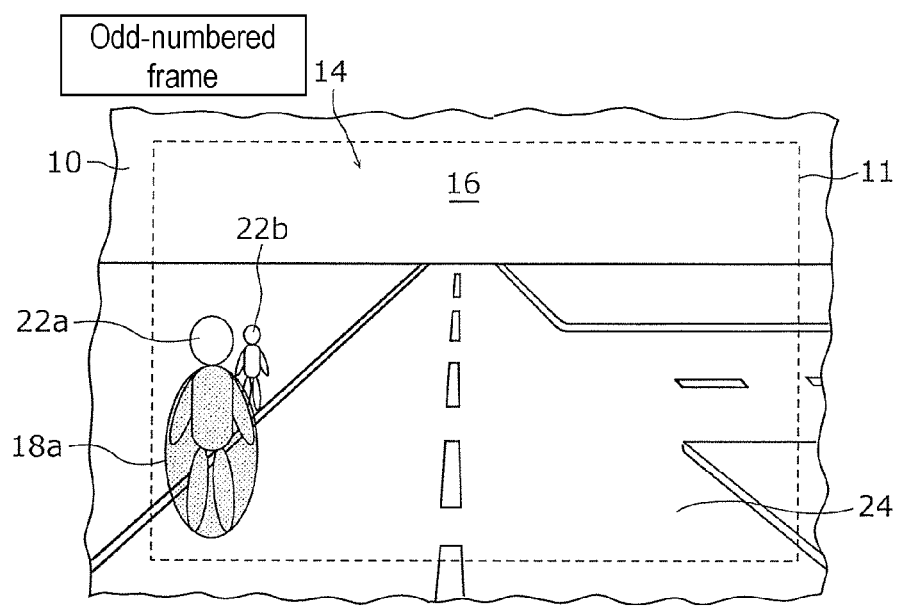
FIG. 9A is a view illustrating an example of a first vertical image displayed by the display device in a first display example.
Figure 9B:
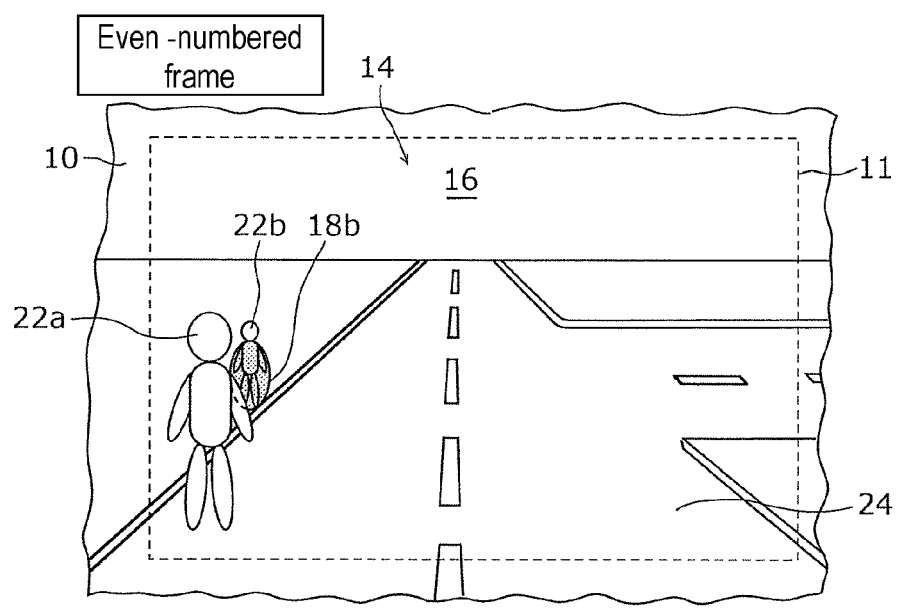
FIG. 9B is a view illustrating an example of a second vertical image displayed by the display device in the first display example.
Figure 10:
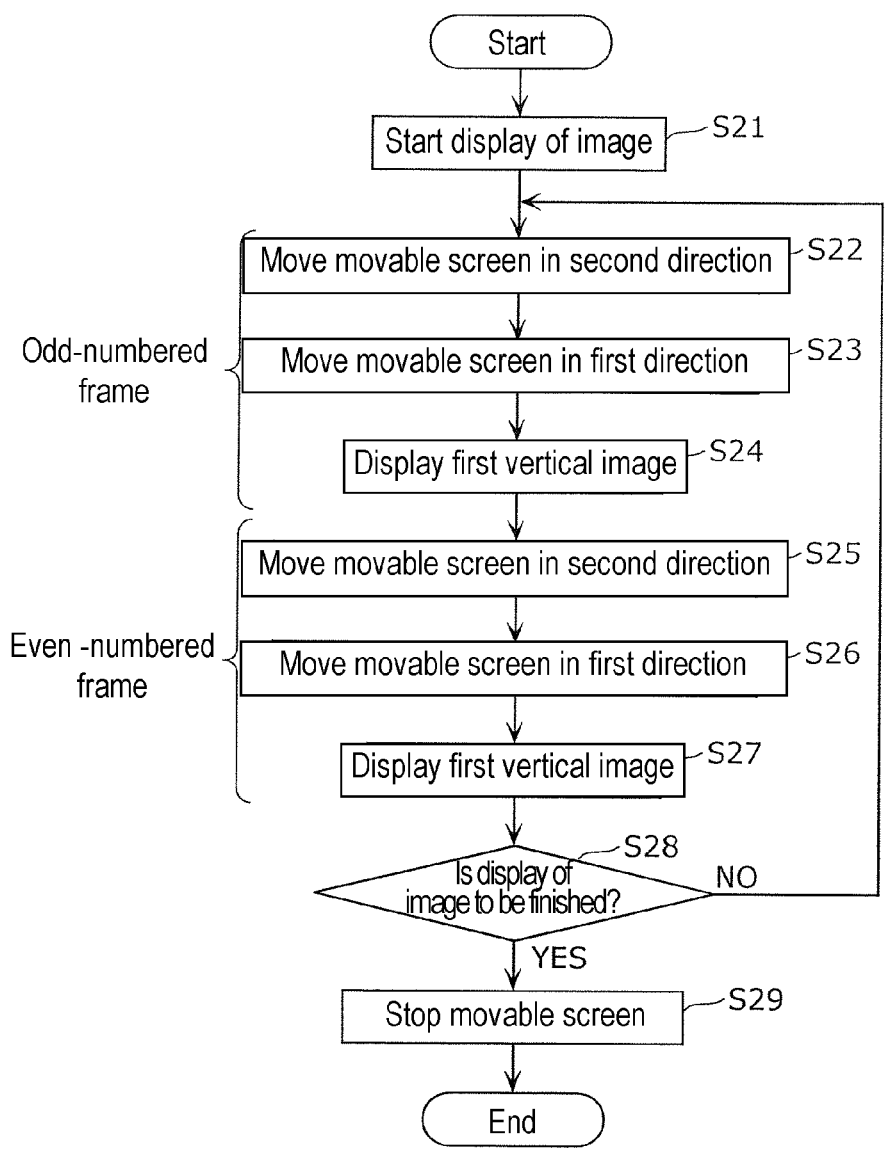
FIG. 10 is a flowchart illustrating a flow of operation of the display device in the first display example.
Figure 11:
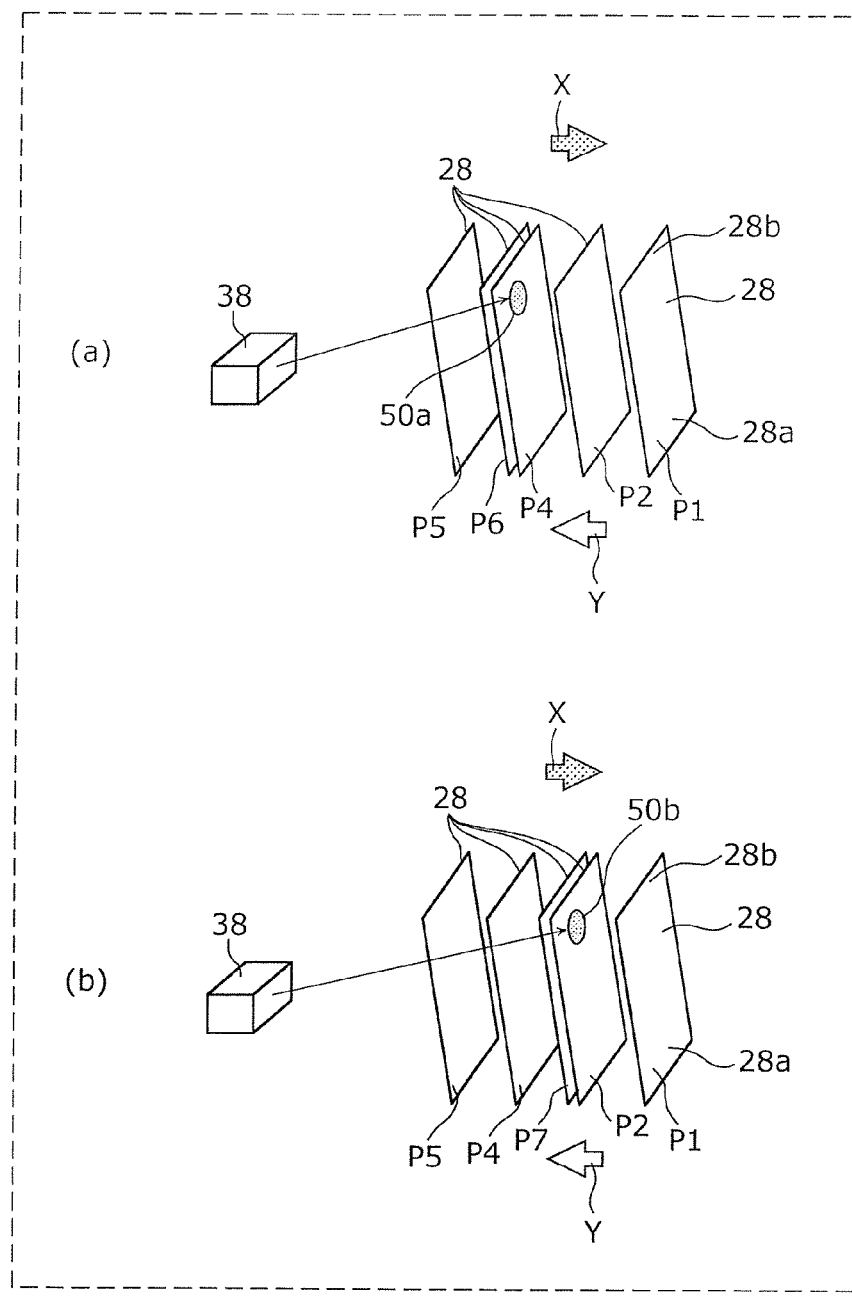
FIG. 11 is a view for describing the operation of the display device in the first display example.

Subsequently, a first display example of display device 2 according to the exemplary embodiment will be described with reference to FIGS. 9A to 11. FIG. 9A is a view illustrating one example of first vertical image 18*a* displayed by display device 2 in the first display example. FIG. 9B is a view illustrating one example of second vertical image 18*b* displayed by display device 2 in the first display example. FIG. 10 is a flowchart illustrating a flow of operation of display device 2 in the first display example. FIG. 11 is a view for describing the operation of display device 2 in the first display example.

As illustrated in FIGS. 9A and 9B, in the first display example, first vertical image 18*a* (an example of a first image) and second vertical image 18*b* (an example of a second image) are displayed in a time-division manner. For example, first vertical image 18*a* is displayed overlapped on pedestrian 22*a* present in front of automobile 4 at a position distant from automobile 4 by about 25 m. Further, second vertical image 18*b* is displayed overlapped on pedestrian 22*b* present in front of automobile 4 at a position distant from automobile 4 by about 64 m. Accordingly, first vertical image 18*a* and second vertical image 18*b* have different distances from windshield 10 in the depth direction (direction perpendicular to the sheet surface of FIG. 9A and FIG. 9B). Noted that, because first vertical image 18*a* and second vertical image 18*b* are alternately displayed at a relatively high speed, driver 12 views first vertical image 18*a* and second vertical image 18*b* as if the two images are displayed simultaneously.

Controller 34 controls display unit 35 so that first vertical image 18*a* and second vertical image 18*b* are displayed in a time-division manner based on image data acquired from an image data generator (not illustrated). The image data is, for example, data in which odd-numbered frames and even-numbered frames are alternately displayed at 60 frames per second. Controller 34 displays first vertical image 18*a* in the odd-numbered frames and displays second vertical image 18*b* in the even-numbered frames. Thus, first vertical image 18*a* and second vertical image 18*b* are displayed in a time-division manner.

Next, the operation of display device 2 in the first display example will be described. As illustrated in FIG. 10, display of first vertical image 18*a* and second vertical image 18*b* is started (S21), and then movable screen 28 starts reciprocating in the first direction and the second direction.

As illustrated in (a) of FIG. 11, in the odd-numbered frame of the image data, movable screen 28 moves from position P1 to position P5 in the second direction (direction indicated by arrow Y in FIG. 11) (S22), and then, moves from position P5 to position P1 in the first direction (direction indicated by arrow X in FIG. 11) (S23). When movable screen 28 is moving in the first direction, the laser light beam from scanner 38 raster-scans movable screen 28 and transmits through movable screen 28, whereby first screen image 50*a* is formed in movable screen 28. Specifically, as illustrated in (a) of FIG. 11, while movable screen 28 moves from position PG to position P4, the position of the laser light beam transmitting through movable screen 28 moves in a direction from first end 28*a* toward second end 28*b* of movable screen 28. First vertical image 18*a* that is the virtual image of first screen image 50*a* is projected on windshield 10 in the same manner as described above, thereby being displayed in space 16 in front of windshield 10 (S24).

Thereafter, as illustrated in (b) of FIG. 11, in the even-numbered frame of the image data, movable screen 28 moves from position P1 to position P5 in the second direction (S25), and then, moves from position P5 to position P1 in the first direction (S26). When movable screen 28 is moving in the first direction, the laser light beam from scanner 38 raster-scans movable screen 28 and transmits through movable screen 28, whereby second screen image 50*b* is formed in movable screen 28. Specifically, as illustrated in (b) of FIG. 11, while movable screen 28 moves from position P7 to position P2, the position of the laser light beam transmitting through movable screen 28 moves in a direction from first end 28*a* toward second end 28*b* of movable screen 28. Second vertical image 18*b* that is the virtual image of second screen image 50*b* is projected on windshield 10 in the same manner as described above, thereby being displayed in space 16 in front of windshield 10 (S27).

When first vertical image 18*a* and second vertical image 18*b* are displayed continuously (NO in S28), steps S22 to S27 described above are executed again. When the display of first vertical image 18*a* and second vertical image 18*b* is to be finished (YES in S28), movable screen 28 stops reciprocating (S29).

In the present display example, first vertical image 18*a* is displayed in the odd-numbered frames, and second vertical image 18*b* is displayed in the even-numbered frames. However, the method for displaying first vertical image 18*a* and second vertical image 18*b* in a time-division manner is not limited thereto. For example, first vertical image 18*a* and second vertical image 18*b* may be displayed alternately every two or more frames (for example, every ten frames). That is, first vertical image 18*a* is displayed in the first to tenth frames, and second vertical image 18*b* is displayed in the eleventh to twentieth frames.

While the method for displaying two images at different distances using movable screen 28 has been described above, a method for displaying two images at different distances using a parallax image may be employed, in place of the above-described method, to display first vertical image 18a and second vertical image 18b.

Moreover, although movable screen 28 reciprocates in this display example, the whole of display device 2 may reciprocate.

[5. Second Display Example]

Figure 12:
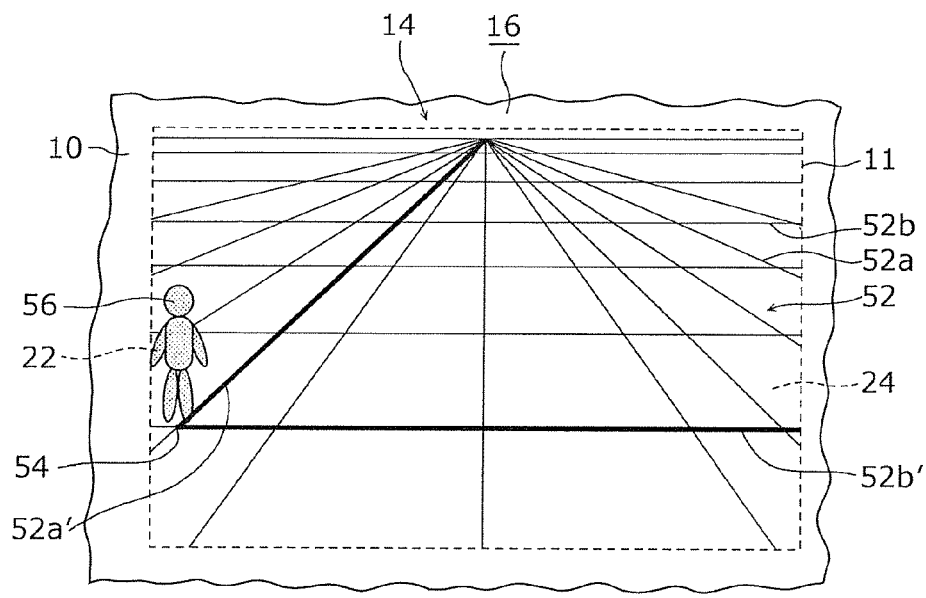
FIG. 12 is a view illustrating one example of a reference pattern and a pedestrian image which are displayed by the display device in a second display example.

Subsequently, a second display example of display device 2 according to the exemplary embodiment will be described with reference to FIG. 12. FIG. 12 is a view illustrating one example of reference pattern 52 and pedestrian image 56 which are displayed by display device 2 in the second display example.

As illustrated in FIG. 12, in the second display example, controller 34 controls display unit 35 so that reference pattern 52 superimposed (overlapped) over pedestrian 22 (an example of a subject) present in space 16 in front of windshield 10 is displayed. Reference pattern 52 is a grid pattern in which a plurality of vertical lines 52a and a plurality of horizontal lines 52b intersect at right angles. Reference pattern 52 is displayed superimposed over road 24 present in front of automobile 4 as the above-described depth image. In addition, reference pattern 52 is displayed such that the position of pedestrian 22 is at intersection point 54 between vertical lines 52a and horizontal lines 52b of the grid pattern (that is, reference pattern 52 is displayed so as to correspond to the position of pedestrian 22).

Further, controller 34 displays pedestrian image 56 to be overlapped on pedestrian 22 as the above-described vertical image such that pedestrian image 56 is superimposed on reference pattern 52. Pedestrian image 56 is, for example, a human-shaped marker. In this case, a part of reference pattern 52 corresponding to the position of pedestrian image 56, that is, both two lines of the grid pattern which are vertical line 52a' and horizontal line 52b' intersecting at intersection point 54, are displayed in a highlighted manner. Examples of conceivable methods for providing a highlighted display include displaying both vertical line 52a' and horizontal line 52b' in thick lines, and displaying both two lines in an eye-catching color. Driver 12 can understand the position of pedestrian 22 by viewing pedestrian image 56.

Controller 34 controls display unit 35 so that reference pattern 52 and pedestrian image 56 described above are displayed based on image data generated by capturing an image of scene 14 (including pedestrian 22 and road 24) in front of automobile 4 with a camera (not illustrated) mounted to automobile 4.

Note that, although reference pattern 52 and pedestrian image 56 are displayed in a 3D manner in the present display example, they may be displayed in a 2D manner.

Further, controller 34 may control display unit 35 so that reference pattern 52 to be overlapped over a vehicle (preceding vehicle) (an example of the subject) present in space 16 in front of windshield 10 is displayed. In this case, controller 34 may display, in addition to pedestrian image 56, a vehicle image to be overlapped on the vehicle as the above-described vertical image such that the vehicle image is superimposed on reference pattern 52.

[6. Third Display Example]

Figure 13:
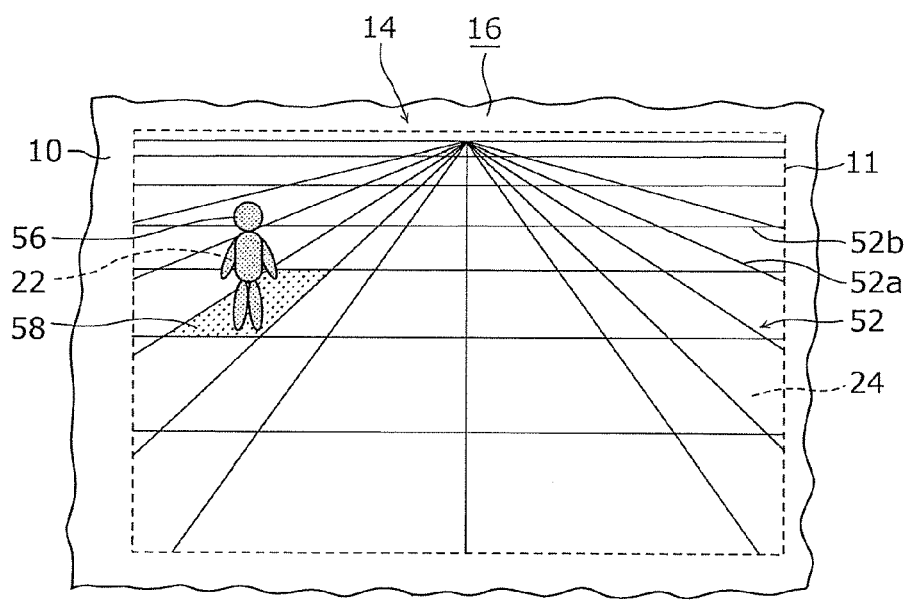
FIG. 13 is a view illustrating one example of a reference pattern and a pedestrian image which are displayed by the display device in a third display example.

Subsequently, a third display example of display device 2 according to the exemplary embodiment will be described with reference to FIG. 13. FIG. 13 is a view illustrating one example of reference pattern 52 and pedestrian image 56 which are displayed by display device 2 in the third display example.

As illustrated in FIG. 13, in the third display example, controller 34 controls display unit 35 so that reference pattern 52 to be overlapped over pedestrian 22 present in space 16 in front of windshield 10 is displayed, as in the second display example. Reference pattern 52 is displayed such that the position of pedestrian 22 is within section 58 (that is, in an area enclosed by a pair of adjacent vertical lines 52a and a pair of adjacent horizontal lines 52b) of the grid pattern. That is, reference pattern 52 is displayed so as to correspond to the position of pedestrian 22. Further, controller 34 displays pedestrian image 56 to be overlapped on pedestrian 22 as the above-described vertical image such that pedestrian image 56 is superimposed on reference pattern 52.

Moreover, in the third display example, a part of reference pattern 52 corresponding to the position of pedestrian image 56, that is, section 58 of the grid pattern where pedestrian image 56 is located, is displayed in a highlighted manner as illustrated in FIG. 13. Examples of conceivable methods for providing a highlighted display include displaying section 58 in an eye-catching color, or displaying a pair of vertical lines 52a and a pair of horizontal lines 52b enclosing section 58 in thick lines. Driver 12 can understand the position of pedestrian 22 by viewing pedestrian image 56.

Note that, although reference pattern 52 and pedestrian image 56 are displayed in a 3D manner in the present display example, they may be displayed in a 2D manner.

[7. Fourth Display Example]

Figure 14:
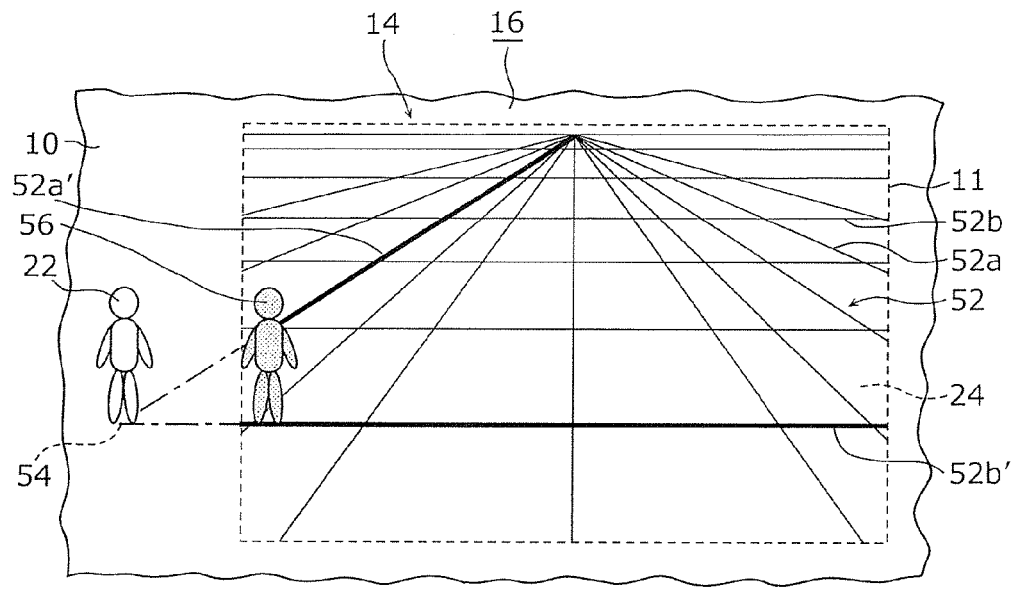
FIG. 14 is a view illustrating one example of a reference pattern and a pedestrian image which are displayed by the display device in a fourth display example.

Subsequently, a fourth display example of display device 2 according to the exemplary embodiment will be described with reference to FIG. 14. FIG. 14 is a view illustrating one example of reference pattern 52 and pedestrian image 56 which are displayed by display device 2 in the fourth display example.

As illustrated in FIG. 14, in the fourth display example, controller 34 controls display unit 35 so that reference pattern 52 to be overlapped over pedestrian 22 present in space 16 in front of windshield 10 is displayed, as in the second display example. Reference pattern 52 is displayed such that the position of pedestrian 22 is at intersection point 54 between vertical lines 52a and horizontal lines 52b of the grid pattern. Further, controller 34 displays pedestrian image 56 to be overlapped on pedestrian 22 as the above-described vertical image such that pedestrian image 56 is superimposed on reference pattern 52.

In addition, in the fourth display example, when the position of pedestrian 22 is not overlaid on reference pattern 52, controller 34 displays pedestrian image 56 so as to be superimposed on a predetermined area (for example, an area closest to the position of pedestrian 22 as viewed from driver 12) of reference pattern 52, as illustrated in FIG. 14. In this case, a part of reference pattern 52 corresponding to the position of pedestrian 22 at the outside of reference pattern 52, that is, both two lines of the grid pattern which are vertical line 52a' and horizontal line 52b' intersecting at intersection point 54, are displayed in a highlighted manner. Examples of conceivable methods for providing a highlighted display include displaying both vertical line 52a' and horizontal line 52b' in thick lines, and displaying both two lines in an eye-catching color. Driver 12 can understand the position of pedestrian 22 by viewing pedestrian image 56, even when the position of pedestrian 22 is not overlaid on reference pattern 52.

Note that, although reference pattern 52 and pedestrian image 56 are displayed in a 3D manner in the present display example, they may be displayed in a 2D manner.

[8. Fifth Display Example]

Figure 15:
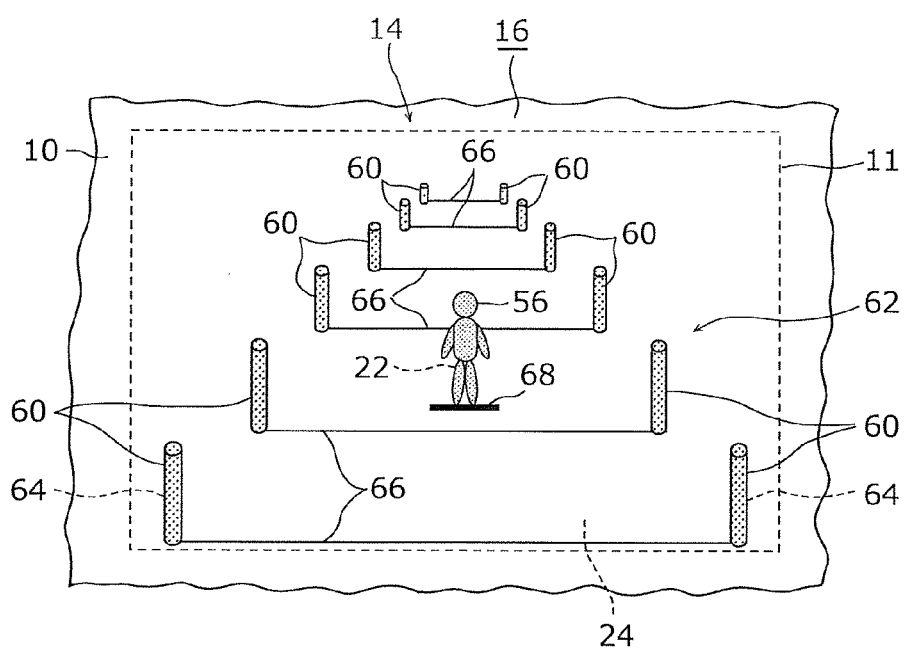
FIG. 15 is a view illustrating one example of a reference pattern and a pedestrian image which are displayed by the display device in a fifth display example.

Subsequently, a fifth display example of display device 2 according to the exemplary embodiment will be described with reference to FIG. 15. FIG. 15 is a view illustrating one example of reference pattern 62 and pedestrian image 56 which are displayed by display device 2 in the fifth display example.

As illustrated in FIG. 15, in the fifth display example, controller 34 controls display unit 35 so that reference pattern 62 including a plurality of guard rail images 60 is displayed. Guard rail images 60 are respectively overlapped on a plurality of guard rails 64 (an example of the subject) present in space 16 in front of windshield 10. Reference pattern 62 includes guard rail images 60 and horizontal lines 66. Each of horizontal lines 66 connects lower ends of a pair of guard rail images 60 facing each other across road 24. Reference pattern 62 is displayed overlapped on road 24 present in front of automobile 4 as the above-described depth image. Reference pattern 62 is also displayed such that each of guard rail images 60 is overlapped on the respective one of guard rails 64 (such that guard rail images 60 correspond to positions of guard rails 64, respectively).

Further, controller 34 displays pedestrian image 56 to be overlapped on pedestrian 22 as the above-described vertical image such that pedestrian image 56 is superimposed on reference pattern 62. In this case, marker 68 extending substantially parallel to horizontal lines 66 is displayed under the feet of pedestrian image 56. Marker 68 indicates the position of pedestrian 22 in the depth direction. Driver 12 can understand the position of pedestrian 22 in the depth direction by viewing the distance between marker 68 and horizontal lines 66.

Note that, although reference pattern 62 and pedestrian image 56 are displayed in a 3D manner in the present display example, they may be displayed in a 2D manner. In addition, reference pattern 62 may include one or more roadside tree images overlapped on one or more roadside trees present in space 16 in front of windshield 10, in place of guard rail images 60.

[9. Sixth Display Example]

Figure 16:
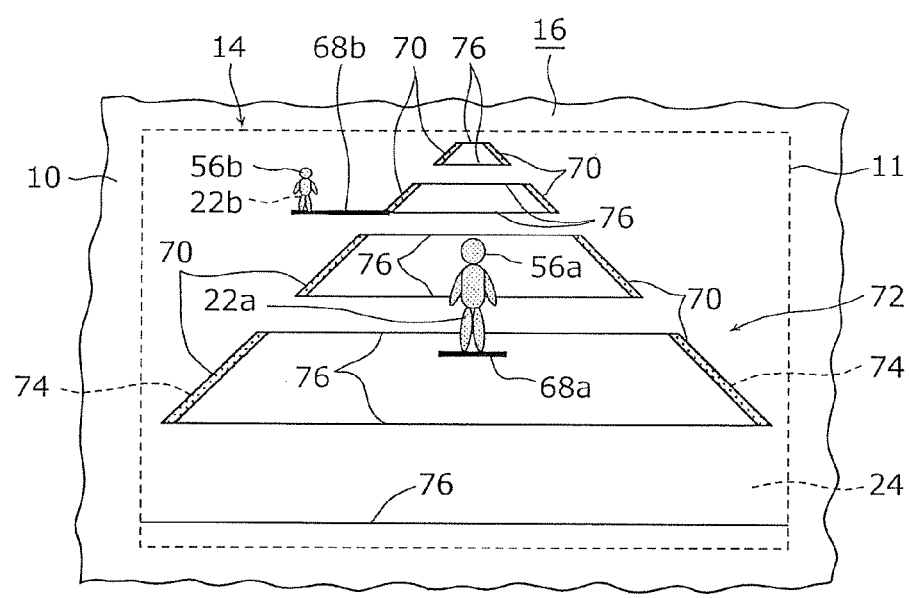
FIG. 16 is a view illustrating one example of a reference pattern and a pedestrian image which are displayed by the display device in a sixth display example.

Subsequently, a sixth display example of display device 2 according to the exemplary embodiment will be described with reference to FIG. 16. FIG. 16 is a view illustrating one example of reference pattern 72 and pedestrian images 56a and 56b which are displayed by display device 2 in the sixth display example.

As illustrated in FIG. 16, in the sixth display example, controller 34 controls display unit 35 so that reference pattern 72 including a plurality of traffic lane line images 70 is displayed. Traffic lane line images 70 are images to be respectively overlapped on a plurality of traffic lane lines 74 (an example of the subject) present in space 16 in front of windshield 10. Reference pattern 72 includes traffic lane line images 70 and pairs of horizontal lines 76. Each pair of horizontal lines 76 connects both ends of a pair of traffic lane line images 70 facing each other across road 24. Reference pattern 72 is displayed overlapped on road 24 present in front of automobile 4 as the above-described depth image. Reference pattern 72 is also displayed such that each of traffic lane line images 70 is overlapped on each of traffic lane lines 74 (such that traffic lane line images 70 correspond to positions of traffic lane lines 74, respectively).

Further, controller 34 displays pedestrian images 56a, 56b to be respectively overlapped on pedestrians 22a, 22b as the above-described vertical image such that pedestrian images 56a, 56b are superimposed on reference pattern 72. In this case, markers 68a, 68b extending substantially parallel to horizontal lines 76 are displayed under the feet of pedestrian images 56a, 56b. Driver 12 can understand the positions of pedestrians 22a, 22b in the depth direction by viewing the distance between each of markers 68a, 68b and horizontal lines 76.

Note that, although reference pattern 72 and pedestrian images 56a, 56b are displayed in a 3D manner in the present display example, they may be displayed in a 2D manner.

[10. Effects]

Subsequently, effects obtained from display device 2 according to the exemplary embodiment will be described. As described in the first display example, first vertical image 18a and second vertical image 18b, which have different distances from windshield 10 in the depth direction, are displayed in a time-division manner, whereby the visibility of first vertical image 18a and second vertical image 18b can be enhanced, even when first vertical image 18a and second vertical image 18b overlap one another in the depth direction.

Modifications

The display device according to one or more aspects have been described above based on the exemplary embodiment. However, the present disclosure is not limited to this exemplary embodiment. Configurations in which various variations conceived by those skilled in the art are applied to the present exemplary embodiment, and configurations established by combining components in different exemplary embodiments or modifications may also fall within the scope of one or more aspects, without departing from the gist of the present disclosure.

For example, the above exemplary embodiment has described a case where display device 2 is mounted to automobile 4. However, the present disclosure is not limited thereto, and display device 2 may be mounted to a motorcycle, an airplane, a train, or a ship, for example.

Furthermore, although the above exemplary embodiment has described a case where display device 2 is mounted to a vehicle, the present disclosure is not limited thereto. Display device 2 may be mounted on, for example, glasses configured as a wearable device.

Further, the moving directions of movable screen 28 when first screen image 40 and second screen image 42 are formed may be reverse to the directions described in the above exemplary embodiment. That is, when movable screen 28 is moving in the second direction, the laser light beam from scanner 38 raster-scans movable screen 28 to form first screen image 40 in movable screen 28. Meanwhile, when movable screen 28 is moving in the first direction, the laser light beam from scanner 38 raster-scans movable screen 28 to form second screen image 42 in movable screen 28.

In the above exemplary embodiment, movable screen 28 reciprocates in a posture inclined to moving directions of movable screen 28. However, movable screen 28 may reciprocate in a posture substantially perpendicular to the moving directions of movable screen 28. In this case, the moment movable screen 28 makes a sudden stop, first vertical image 18a or second vertical image 18b is displayed.

In the above exemplary embodiment, pedestrian image 56 (56a, 56b) overlapped on pedestrian 22 (22a, 22b) is displayed. However, the present disclosure is not limited thereto. For example, a preceding vehicle image overlapped on a preceding vehicle or a bicycle image overlapped on a bicycle may be displayed.

In the foregoing exemplary embodiment, the constituent elements may be implemented in dedicated hardware or with execution of software programs individually suitable for those constituent elements. The constituent elements may be implemented by a program execution section, such as a CPU or a processor, reading and executing software programs stored in a recording medium, such as a hard disk or a semiconductor memory.

Furthermore, the following cases are also involved in the present disclosure.

(1) Specifically, the above-described devices can be implemented using a computer system configured with a microprocessor, a read only memory (ROM), a random access memory (RAM), a hard disk unit, display unit, keyboard, mouse, and the like. A computer program is stored in the RAM or the hard disk unit. The microprocessor operates according to the computer program, and therefore the devices achieve the respective functions. Herein, the computer program is configured by combining a plurality of instruction codes that indicate instructions to a computer, in order to achieve predetermined functions.

(2) A part or all of the constituent elements configuring the above-described devices may be configured with a single-chip system large-scale-integration (LSI). The system LSI is a super multi-functional LSI manufactured such that a plurality of constituent units is integrated into a single chip, and specifically, is a computer system including the microprocessor, the ROM, the RAM, and the like. The ROM stores the computer program. The microprocessor loads the computer program from the ROM to the RAM, and performs operation such as computation according to the loaded computer program, and thus the system LSI achieves its functions.

(3) A part or all of the constituent elements configuring the above-described devices may be configured with an integrated circuit (IC) card or a single module detachable from each of the devices. The IC card or the module is the computer system configured with the microprocessor, the ROM, the RAM, and the like. The IC card or the module may include the above-described super multi-functional LSI. The microprocessor operates according to the computer program, and thus the IC card or the module achieves its functions. The IC card or the module may have tamper resistance.

(4) The present disclosure may be implemented by using the above-described methods. Those methods may be implemented by using the computer program that is implemented by the computer, or may be implemented by using digital signals according to the computer program.

Furthermore, the present disclosure may be implemented by using a configuration that stores the computer program or the digital signals into a computer-readable recording medium such as a flexible disk, a hard disk, a compact disk (CD)-ROM, a magneto-optical disk (MO), a digital versatile disk (DVD), a DVD-ROM, a DVD-RAM, a Blu-ray (registered trademark) disk (BD), and a semiconductor memory. In addition, the present disclosure may be implemented by using the digital signals stored in those recording media.

The present disclosure may be implemented by transmitting the computer program or the digital signals via a network represented by a telecommunications line, a wireless or wired communication line, and the Internet, data broadcasting, and the like.

The present disclosure may may be implemented with the computer system including the microprocessor and the memory. The memory may store the computer program, and the microprocessor may operate according to the computer program.

The program or the digital signals may be performed by another computer system that is independently provided, by being stored into a recording medium to be transported to the other computer, or by being transported to the other computer via networks and the like.

(5) The above-described exemplary embodiment and the above-described modifications may be combined.

INDUSTRIAL APPLICABILITY

A display device according to the present disclosure is applicable to a vehicle-mounted head-up display, for example.

REFERENCE MARKS IN THE DRAWINGS

2: display device
4: automobile
6: dashboard
8: image
10: windshield
11: area
12: driver
14: scene
16: space
18: vertical image
18a: first vertical image
18b: second vertical image
20: depth image
22, 22a, 22b: pedestrian
24: road
26: light projection unit
28, 28A: movable screen
28a: first end
28b: second end
30: drive unit
32: image projection unit
34: controller
35: display unit
36: light source
38: scanner
40, 50a: first screen image
40a: first intermediate image
42, 50b: second screen image
42a: second intermediate image
44: magnifying lens
46: first reflecting plate
48: second reflecting plate
52, 62, 72: reference pattern
52a, 52a': vertical line
52b, 52b', 66, 76: horizontal line
54: intersection point
56, 56a, 56b: pedestrian image
58: section
60: guard rail image
64: guard rail
68, 68a, 68b: marker
70: traffic lane line image
74: traffic lane line

The invention claimed is:
1. A display device, comprising:
a projector that projects a light beam onto a display medium based on image data so that the light beam is reflected from the display medium to display one or more virtual images in a space further than the display medium in a depth direction through the display medium;
a processor; and a memory including a program that, when executed, causes the processor to perform operations including:

controlling the projector so that a plurality of images which is included in the one or more virtual images is displayed in a time-division manner, the plurality of images having different distances from the display medium in the depth direction, wherein the projector includes:
- a light source that emits the light beam;
- a scanner that causes the light beam from the light source to scan;
- a movable screen in which the plurality of images is formed by transmitting the light beam from the scanner;
- a driver that causes the movable screen to reciprocate in a first direction away from the scanner and in a second direction approaching the scanner during each of multiple frames; and
- an optical system that displays the plurality of images formed in the movable screen in the space, the plurality of images includes a first image and a second image, the first image is included in an odd-numbered frame of the image data and the second image is included in an even-numbered frame of the image data, the first image is displayed at a first timing while the movable screen is moving in the first direction during the odd-numbered frame of the multiple frames and the second image is displayed at a second timing while the movable screen is moving in the first direction during the even-numbered frame of the multiple frames, such that the first image and the second image are displayed in the time-division manner.

2. The display device according to claim 1, wherein the first image and the second image are displayed alternately every two or more frames of the multiple frames to display the first image and the second image in the time-division manner.

3. The display device according to claim 1, wherein the display medium is a vehicular windshield, and the space is a space in front of the vehicular windshield as viewed from a driver.

4. The display device according to claim 1, wherein the first image is displayed at the first timing while the movable screen is moving in the first direction during each of odd-numbered frames of the multiple frames, and the second image is displayed at the second timing while the movable screen is moving in the first direction during each of even-numbered frames of the multiple frames.

5. The display device according to claim 1, wherein the first image and the second image are displayed alternately at the first timing and the second timing while the movable screen is moving in the first direction during the multiple frames.

6. The display device according to claim 1, wherein the first timing and the second timing are configured to display the first image and the second image at the different distances from the display medium in the depth direction.

7. The display device according to claim 1, wherein the driver is an actuator.

8. The display device according to claim 1, wherein the driver causes the movable screen to reciprocate in the first direction away from the scanner and in the second direction approaching the scanner during each of the multiple frames at a constant frequency and with a constant amplitude.

* * * * *